United States Patent
Dousseaud et al.

(10) Patent No.: US 9,695,693 B2
(45) Date of Patent: Jul. 4, 2017

(54) INSERT WITH AN EXTERNAL SURFACE WHICH IS PART OF AT LEAST ONE AERODYNAMIC PROFILE OF A TURBOMACHINE TEST BLADE

(71) Applicant: SNECMA, Paris (FR)

(72) Inventors: Sylvain Dousseaud, Savigny le Temple (FR); Gregory Nicolas Gerald Gillant, Mennecy (FR)

(73) Assignee: SNECMA, Paris (FR)

( * ) Notice: Subject to any disclaimer, the term of this patent is extended or adjusted under 35 U.S.C. 154(b) by 413 days.

(21) Appl. No.: 14/322,180

(22) Filed: Jul. 2, 2014

(65) Prior Publication Data

US 2015/0017005 A1    Jan. 15, 2015

(30) Foreign Application Priority Data

Jul. 3, 2013 (FR) ..................... 13 56520

(51) Int. Cl.
| | | |
|---|---|---|
| *F01D 5/14* | (2006.01) | |
| *F01D 21/00* | (2006.01) | |
| *G01M 9/08* | (2006.01) | |
| *F01D 9/04* | (2006.01) | |

(52) U.S. Cl.
CPC ............... *F01D 5/14* (2013.01); *F01D 9/042* (2013.01); *F01D 21/003* (2013.01); *G01M 9/08* (2013.01); *F05D 2260/83* (2013.01); *Y10T 29/49336* (2015.01)

(58) Field of Classification Search
CPC .......... F01D 5/14; F01D 9/042; F01D 21/003; F01D 5/188; F01D 5/189; F01D 9/044; G01M 9/08; Y10T 29/49336; F05D 2260/83; F05D 2240/12; F05D 2240/125
See application file for complete search history.

(56) References Cited

U.S. PATENT DOCUMENTS

| 4,118,147 A | 10/1978 | Ellis | |
|---|---|---|---|
| 7,024,929 B2 * | 4/2006 | Fleming | ................. G01M 9/04 73/147 |
| 7,452,182 B2 * | 11/2008 | Vance | ....................... F01D 5/14 415/135 |

(Continued)

FOREIGN PATENT DOCUMENTS

| EP | 0 255 145 A2 | 2/1988 |
|---|---|---|
| EP | 1 640 562 A1 | 3/2006 |
| EP | 2 607 628 A2 | 6/2013 |

OTHER PUBLICATIONS

French Preliminary Search Report issued Jun. 10, 2014, in Patent Application No. FR 1356520, filed Jul. 3, 2013 (with English Translation of Category of Cited Documents).

(Continued)

*Primary Examiner* — Kenneth Bomberg
*Assistant Examiner* — Hoon Choi
(74) *Attorney, Agent, or Firm* — Oblon, McClelland, Maier & Neustadt, L.L.P.

(57) ABSTRACT

The invention relates to an insert for a turbine engine test vane including the insert and a vane body. The insert includes at least two external surfaces. The insert is configured to fit into the vane body, such that the external surfaces are vane aerodynamic surfaces each forming part of a vane aerodynamic profile.

5 Claims, 4 Drawing Sheets

(56) References Cited

U.S. PATENT DOCUMENTS

| | | | |
|---|---|---|---|
| 7,789,621 B2* | 9/2010 | Dierksmeier | F01D 5/147 |
| | | | 415/191 |
| 7,841,834 B1 | 11/2010 | Ryznic | |
| 8,033,790 B2* | 10/2011 | Vance | F01D 5/147 |
| | | | 416/213 R |
| 2009/0252612 A1* | 10/2009 | Ahmad | B23P 15/04 |
| | | | 416/241 A |
| 2013/0164140 A1 | 6/2013 | Shah et al. | |

OTHER PUBLICATIONS

French Preliminary Search Report issued Jun. 12, 2014 in Patent Application No. 1356520 (with English translation of categories of cited documents).
Search Report issued Jan. 16, 2015 in United Kingdom Patent Application No. GB1411896.2.
U.S. Appl. No. 14/413,508, filed Jan. 8, 2015, Gillant, et al.

\* cited by examiner

INSERT WITH AN EXTERNAL SURFACE WHICH IS PART OF AT LEAST ONE AERODYNAMIC PROFILE OF A TURBOMACHINE TEST BLADE

TECHNICAL FIELD

The invention relates to tests of turbine engine aerodynamic profiles. More precisely, the invention belongs to the technical domain of test vanes for aerodynamic turbine engine profiles.

STATE OF PRIOR ART

The different aerodynamic profiles of a turbine engine can have a major influence on the general performances of the turbine engine, particularly the thrust of the turbine engine, the efficiency of the turbine engine, the noise generated by it, etc. The configuration of turbine engine vanes has a significant influence on the aerodynamic performances of the turbine engine. Therefore, optimisation of the different aerodynamic profiles of turbine engine vanes is a major concern.

It is also difficult to digitally model the aerodynamic behaviour of a turbine engine, for example starting from the Navier Stokes equation. Many turbine engine aerodynamic tests are often necessary on the test bench.

In particular, different vane profiles are tested on full-scale turbine engines during these tests. These tests impose severe constraints, particularly in terms of cost and time. For example, at the present time, turbine engines often have to be entirely disassembled and removed from their test bench during the tests. The result is a significant cost and time to assemble/disassemble the test vanes. Apart from being expensive and taking a long time, it may also be difficult to manufacture and machine test vanes.

PRESENTATION OF THE INVENTION

The invention aims to at least partially solve the problems that arise with solutions according to prior art.

In this respect, the purpose of the invention is an insert for a turbine engine test vane comprising two opposite aerodynamic profiles, the vane also comprising the insert and a body, the insert comprising two external aerodynamic surfaces, the insert being configured to fit into the body of the vane such that each of the external aerodynamic surfaces forms part of one of the vane aerodynamic profiles;

the insert comprising a central part and at least two opposite profiled parts on each of which one of the external surfaces is located, the profiled parts being mechanically connected to the central part, so as to be motionless relative to the central part, particularly being formed as an integral part with the central part, According to the invention, at least one of the profiled parts is configured to project on the upstream and/or downstream side of the central part.

The test vane insert according to the invention makes it possible to perform tests on several vane aerodynamic profiles more quickly and much less expensively. In practice, the advantages procured by the invention increase as the number of aerodynamic tests to be carried out on different profiles increases.

Elements that are expensive to manufacture and which form part of vanes are reused from one profile aerodynamic test to the next. In particular, the vane body is at least partly left in position from one test to the next. The insert instead of the entire test vane is changed for each new test.

The insert is smaller than the vane. Similarly, external aerodynamic surfaces of the insert are aerodynamic areas of the vane and are smaller than the areas of the aerodynamic profiles of the vane of which they form part. The result is savings of material, savings of fabrication time, savings of machining costs and simplifications for manufacture of the test vane.

In particular, these aerodynamic profiles may be either the intrados or the extrados of the test vane. Consequently, the test vane comprises two opposite aerodynamic profiles, an intrados and an extrados that may be identical or different.

Assembly and/or disassembly of the test vane during the aerodynamic tests is simplified due to the low mass of the insert, its configuration and its small size relative to the overall test vane. The invention can thus save costs and can reduce assembly and/or disassembly times of test vanes.

In particular, reductions in assembly and/or disassembly times made possible by the invention can make it possible to perform more aerodynamic tests and thus indirectly to improve the general performance of the turbine engine.

In particular, the profiled parts may be formed as an integral part with the central part, profiled parts and the central part being made from the same material.

The central part makes the mechanical connection between profiled parts and the body of the vane. More generally, the central part provides most of the mechanical strength of the insert. The mechanical stresses applied on the profiled parts are reduced, making it possible to focus more on machining of the external aerodynamic surfaces of the insert.

Optionally, the invention may comprise one or several among the following characteristics that may or may not be combined together:

The vane body comprises an upstream part and a downstream part, the insert being configured to fit into the vane body between the upstream part and the downstream part such that each aerodynamic profile of the vane comprising one of the external aerodynamic surfaces is aerodynamically continuous from the upstream part to the downstream part.

In this preferred configuration, the insert is not entirely on the upstream side of the vane, in other words in the immediate vicinity of the location at which the test vane is fixed on the turbine engine. Mechanical stresses applied on the vane are particularly high at this location. Thus, in being housed further downstream in the vane body, the insert can be fabricated with lower mechanical strength.

Furthermore, the continuity of the vane aerodynamic profile makes it possible to perform more significant aerodynamic tests.

More generally, fabrication of the insert is easier for an approximately equivalent aerodynamic performance.

Advantageously, the insert is configured to fit into the vane body through at least one mortise and tenon assembly. In this way, each mortise and tenon assembly enables the insert to fit into the vane body to facilitate good mechanical strength of the insert during an aerodynamic test.

The insert is preferably housed in the vane body through a mortise and tenon assembly between the upstream part and the insert, and a mortise and tenon assembly between the insert and the downstream part.

The insert is preferably configured to be symmetric about an approximately median longitudinal curved surface of the vane to improve the aerodynamic performances of the vane. Similarly, the test vane is preferably symmetric about this surface for the same reason.

Advantageously, the insert is made using fast prototyping processes to reduce manufacturing times and test costs. For example the insert may be made by stereolithography, particularly from photo-polymerisable resin or may be based on metallic powder.

The invention is also related to a turbine engine test vane comprising an insert like that defined above and a vane body in which the insert is configured to fit.

The test vane body comprises an upstream part and a downstream part, the vane body comprising a housing for an insert like that defined above, the housing being located between the upstream part and the downstream part. The housing opens up onto the aerodynamic profiles of the vane, such that the insert has two external surfaces that are aerodynamic surfaces of the vane, each of which will form part of one of the two aerodynamic profiles of the test vane.

The vane body preferably comprises a vane attachment root to a fixed part of the turbine engine such as a fixed casing, the housing being located in the attachment root.

In this way, the insert is sufficiently far upstream from the vane such that the configuration of the insert has a significant influence on fluid flow along the vane.

In this case, the body of the test vane very preferably comprises an upstream part downstream from which the insert is housed, to limit the intensity of mechanical stresses applied on the insert.

Preferably, the test vane is a fixed turbine engine vane such as an outlet guide vane or a stator vane. The vane is then preferably an outlet guide vane configured to be fixed in a turbine engine fan flowpath.

The invention also relates to a turbine engine aerodynamic test assembly comprising a test vane like that defined above and at least one additional insert like that defined above, the inserts having different shapes and being configured to be housed interchangeably in the vane body.

In this very preferred configuration, the test assembly only comprises a single vane body and a different insert for each aerodynamic vane profile to be tested.

The invention also relates to a turbine engine comprising an aerodynamic test assembly like that defined above.

Similarly, the invention also relates to a method for assembling an aerodynamic test assembly like that defined above into a turbine engine on a test bench, the test vane being an output guide vane comprising a vane body comprising an upstream part and a downstream part, each insert in the test assembly being configured so that it fits into the body of the vane between the upstream part and the downstream part in a housing opening up onto at least one vane aerodynamic profile, the method comprising:
  a disassembly step during which at least one turbine engine fan vane is disassembled, the upstream part of the vane body being withdrawn radially outwards, a first insert of the test assembly being withdrawn axially through the front of the turbine engine,
  an assembly step during which a second insert of the test assembly is housed axially through the front in the vane body, the upstream part being mounted radially while being mechanically connected to the insert, the previously disassembled fan vanes being reassembled.

Since the test vane is composed of segments, there is no longer any need to remove it as an integral part. Elements of the test assembly can then be assembled and/or disassembled without removing the turbine engine from the test bench.

BRIEF DESCRIPTION OF THE DRAWINGS

This invention will be better understood after reading the following description of example embodiments given solely for guidance and that are in no way limitative, with reference to the appended drawings in which.

DETAILED PRESENTATION OF PARTICULAR EMBODIMENTS

Identical, similar or equivalent parts of the different figures are marked with the same numerical references to facilitate comparison between one figure and another.

Figure 1:
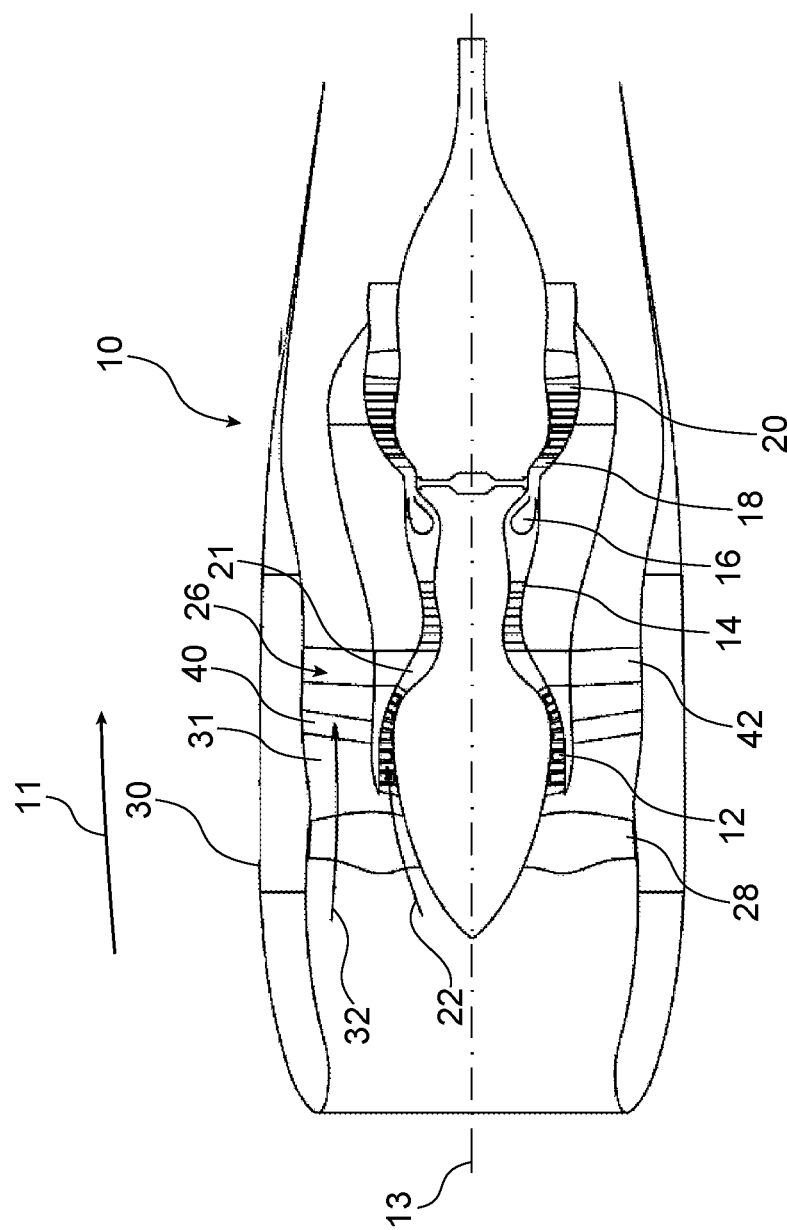
FIG. 1 shows a diagrammatic axial sectional view of a twin spool turbofan according to one preferred embodiment of the invention.

FIG. 1 shows a twin-spool turbofan 10. For example, the turbine engine 10 is a twin-spool turbofan. During aerodynamic profile tests, the turbine engine 10 is located on a test bench (not shown).

Working along the upstream to downstream direction, the turbine engine 10 comprises a low pressure compressor 12, a high pressure compressor 14, a combustion chamber 16, a high pressure turbine 18 and a low pressure turbine 20. These elements together define a core engine flow path 21 through which a primary gas flow 22 passes. The main flow direction of gases 22 that is the same as the upstream to downstream direction is diagrammatically shown by arrow 11.

The high pressure turbine 18 forms a high pressure casing with the high pressure compressor 14 to which it is fixed, while the low pressure turbine 20 is fixed to the low pressure compressor 12 so as to form a low pressure casing. Each turbine 18, 20 drives the associated compressor 14, 12 in rotation about a longitudinal axis of the turbojet 13 under the effect of the thrust of gases from the combustion chamber 16.

There is an intermediate frame 26 between the low pressure compressor 12 and the high pressure compressor 14.

The turbine engine 10 is a twin-spool turbofan. Consequently, it also comprises a fan 28 around which a nacelle 30 is formed to generate a fan flow 32 through a fan flowpath 31. Fixed vanes called outlet guide vanes 40, 42 pass through the fan flowpath 31.

The outlet guide vanes 40, 42 are also known by their abbreviation OGV. In particular, these vanes 40, 42 are in the form of an "arm".

Some of the outlet guide vanes 42 form part of the structure, in other words they are configured to appropriately distribute mechanical stresses within the turbine engine 10. In particular, these structural outlet guide vanes 42 form part of the fan frame 26.

With reference to FIGS. 2 to 4 and FIGS. 6 to 8, the outlet guide vanes 40, 42 are fixed to the turbine engine 10 through an attachment root 412 to fix the vane 40, 42 to a fixed part of the turbine engine 10 such as a fixed casing (not shown).

The attachment root 412 may be fixed to the fixed part of the turbine engine 10 in various ways known to those skilled in the art. For example, the attachment root 412 comprises an attachment plate 414 fixing the outlet guide vane 40, 42 to the fixed part of the turbine engine 10 by bolting.

The outlet guide vane 40, 42 comprises a recess 409 that limits the mass of the vane 40, 42, in a known manner.

The outlet guide vanes 40, 42 are preferably symmetric about an approximately median longitudinal curved surface 463 of the vane 40 that separates the vane 40 into two symmetric parts 462, 464, so as to improve the aerodynamic performances of the vane.

Aerodynamic tests are performed on the aerodynamic profiles 402, 404 of these vanes 40, 42, the vanes 40, 42 being fixed to the turbine engine 10 that is then installed on a test bench, to optimise the profile of the outlet guide vanes 40, 42. The tested aerodynamic profiles 402, 404 are conventionally called the intrados and extrados respectively.

Figure 2:
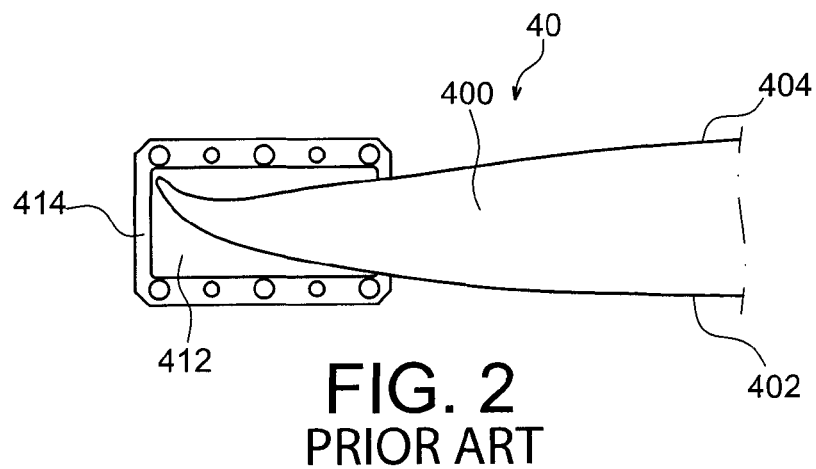
FIG. 2 shows a radial view looking inwards showing a partial diagrammatic view of a turbine engine test vane according to an embodiment according to prior art.
Figure 3:
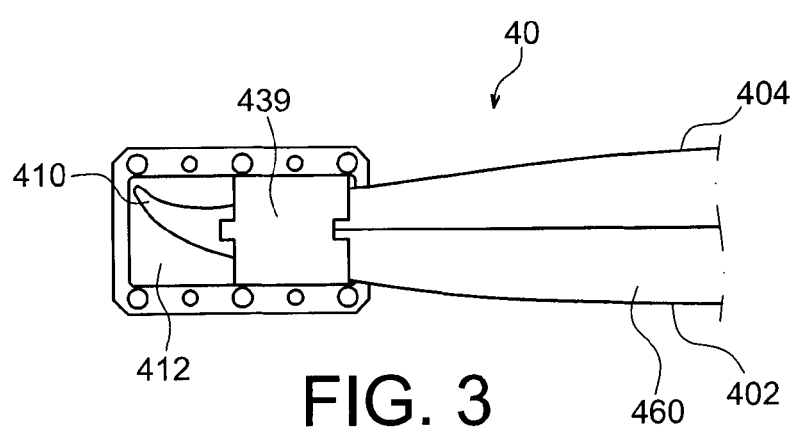
FIG. 3 shows a radial partial diagrammatic view looking inwards showing a test vane body located on the turbine engine shown in FIG. 1, according to one preferred embodiment of the invention.
Figure 4:
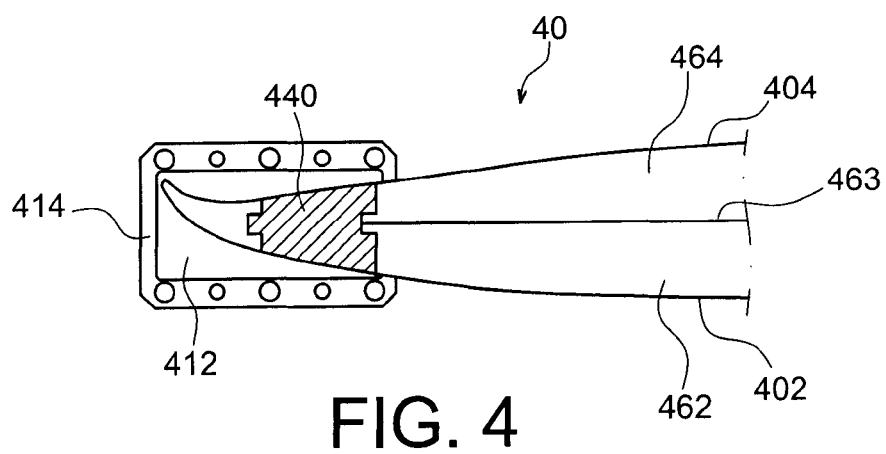
FIG. 4 shows a radial view looking inwards showing a partial diagrammatic view of the test vane including the vane body shown in FIG. 3, according to the embodiment of the invention simulating the configuration in FIG. 2.
Figure 5:
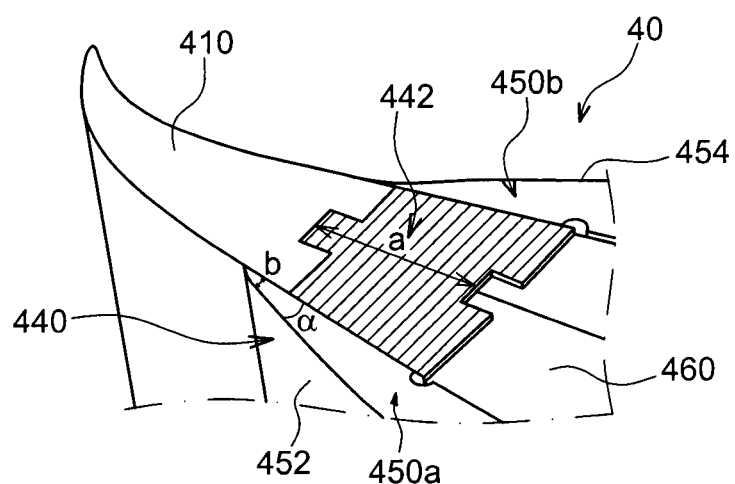
FIG. 5 is a partial perspective view of the test vane comprising the vane body in FIG. 3, according to one preferred embodiment of the invention.

With reference particularly to FIG. 2, each outlet guide vane 40, 42 according to embodiments in prior art is made as an integral part with a body of the vane 400 fixed to the attachment root 412 that is itself mechanically fastened to the turbine engine 10 during the aerodynamic tests.

Each test vane 40 shown in FIGS. 3 to 8 is composed of complementary assembly segments 400, 440, to reduce the costs and time necessary to perform these aerodynamic tests. More precisely, each test vane 40 forms part of an aerodynamic test assembly for a turbine engine 10 including the test vane 40 and a plurality of inserts 440 for different shapes of test vanes 40 configured to fit interchangeably into the test vane 40.

The test vanes 40 comprise a body 400 of the vane 40 configured so that one interchangeable insert 440 fits in the test assembly at one time. The body 400 of the vane 40 comprises an upstream part 410 and a downstream part 460, the insert 440 being configured to fit into the body 400 of the vane 40 in the housing 439 preferably located between the upstream part 410 and the downstream part 460. The housing 439 is also preferably located in the attachment root 412.

The housing 439 opens up onto at least one aerodynamic profile 402, 404 in the vane 40. In other words, the insert 440 comprises at least one external surface 452, 454 that will form an aerodynamic surface of the vane 40 forming part of an aerodynamic profile 402, 404 of the vane 40, when the insert is located in the housing 439 of the body 400 of the vane 40.

There is an insert 440 for each aerodynamic profile test of the test vane 40, while the body 400 of the test vane 40 is reused during each aerodynamic test. Except in exceptional circumstances, the body 400 of the vane 40 is left in position on the turbine engine 10 from one test to another. At the most, the only part temporarily removed between two aerodynamic tests is a small portion of the body 400 of the vane 40, in other words in practice the upstream part 410.

Considering that the insert 440 avoids the need to remove the entire test vane 40 and particularly to remove it as an integral part, the insert 440 can reduce assembly and/or disassembly costs of the turbine engine 10 during aerodynamic profile tests of test vanes 40. The presence of the insert 440 also reduces assembly and/or disassembly times necessary for these aerodynamic tests. Indirectly, the insert 440 can advantageously make it possible to perform more aerodynamic profile tests and consequently contribute to improving the global performances of the turbine engine 10.

Since the area of the external aerodynamic surface 452, 454 of the insert 440 is smaller than the area of the aerodynamic profile 402, 404 of the test vane 40 of which it forms part, the insert 440 can save material, manufacturing time and machining costs and can simplify manufacturing of the test vane 40.

The housing 439 and the insert are preferably configured such that the external aerodynamic surface 452, 454 makes the aerodynamic profile 402, 404 of the vane 40 continuous from the upstream part 410 to the downstream part 460. The aerodynamic properties of the test vane 40 are then maintained more reliably and are similar to the properties of an integral test vane 40 according to prior art, in which the entire part of each aerodynamic profile 402, 404 is machined as shown in FIG. 2.

Still with reference to FIGS. 4 to 8, the housing 439 and the insert 440 are preferably configured so that the insert 440 opens up onto the intrados 402 and the extrados 404. The insert 440 then comprises two external aerodynamic surfaces 452, 454 each forming part of one of the aerodynamic profiles 402, 404 of the vane 40. The insert 440 is configured to fit into the body 400 of the vane 40 "like a jig-saw puzzle".

Preferably, the insert 440 is configured to fit into the body of the vane. In particular, the housing 439 and the insert 440 are configured such that the insert 440 forms a mortise and tenon assembly with the upstream part 410 of the body 400 of the vane 40 and a mortise and tenon assembly with the downstream part 460 when the insert 440 is located in the housing 439.

With reference more specifically to FIGS. 5 to 8, the insert 440 comprises a central part 442 and at least two profiled parts 450a, 450b opposite each other on each of which there is one of the external surfaces 452, 454. The profiled parts 450a, 450b are mechanically connected to the body 400 of the vane 40 through the central part 442 to which they are fixed.

According to one embodiment, the profiled parts 450a and 450b form an integral part of the central part 442.

As a variant, the profiled parts 450a and 450b are separate from the central part 442, the profiled parts 450a, 450b being mechanically connected so that they are fixed with the central part 442.

In all cases, the profiled parts 450a, 450b are mechanically connected to the central part 442 so as to be motionless relative to the central part. Furthermore, the profiled parts 450a, 450b and the central part 442 are installed and removed as an integral part onto or from the body 400 of the vane 40.

The profiled parts 450a, 450b are configured to project upstream and/or downstream from the central part 442. In other words, the profiled parts 450a, 450b partially cover the external aerodynamic surface of the body 400 of the vane 40.

Figure 6:
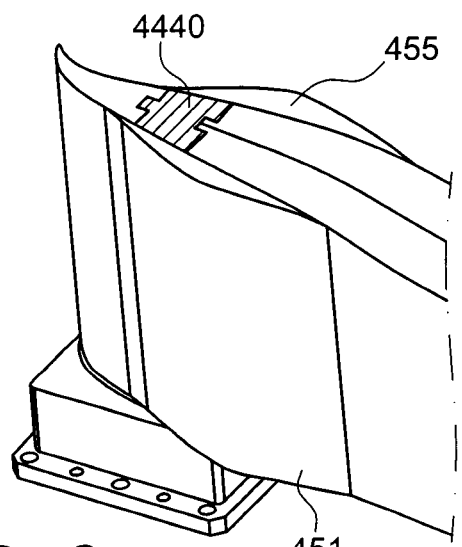
FIG. 6 is a partial diagrammatic view of a test vane comprising an insert forming a first aerodynamic profile of the vane according to the preferred embodiment of the invention.
Figure 7:
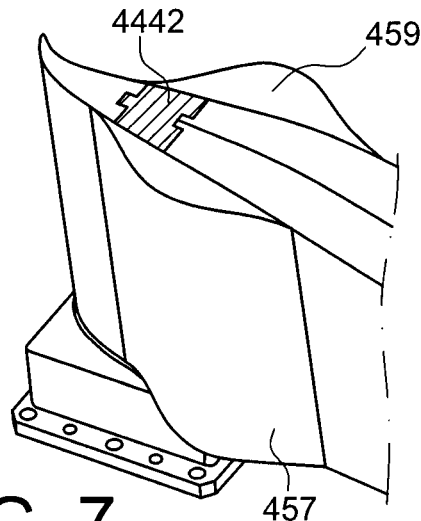
FIG. 7 is a partial diagrammatic view of a test vane comprising an insert forming a second aerodynamic profile of the vane distinct from the first profile, according to the preferred embodiment of the invention.

The only difference between the test vanes 40 shown in FIGS. 6 and 7 is in the configuration of the profiled parts 450a, 450b, more precisely the external aerodynamic surface 451, 455, 457, 459 of the inserts 4440 and 4442.

The test vane 40 is a non-structural outlet guide vane 40, particularly so that the insert 440 can be made starting from the fast prototyping method and at low cost. In this case, each part 442, 450a, 450b of the insert 440 may for example be made by stereolithography, in photo-polymerisable resin or based on metallic powder.

The central part is of the order of 10 to 25 times larger than the width b of the profiled parts 450a, 450b close to the end, preferably about 15 times larger than the width b. For example, the angle α formed by each profiled part 450a, 450b varies from 0° to 45°, preferably from 4° to 19° and particularly from 4° to 11° from one insert to the next so as to vary each profile 402, 404 of the test vane 40 from one insert 440 to the next.

Figure 8:
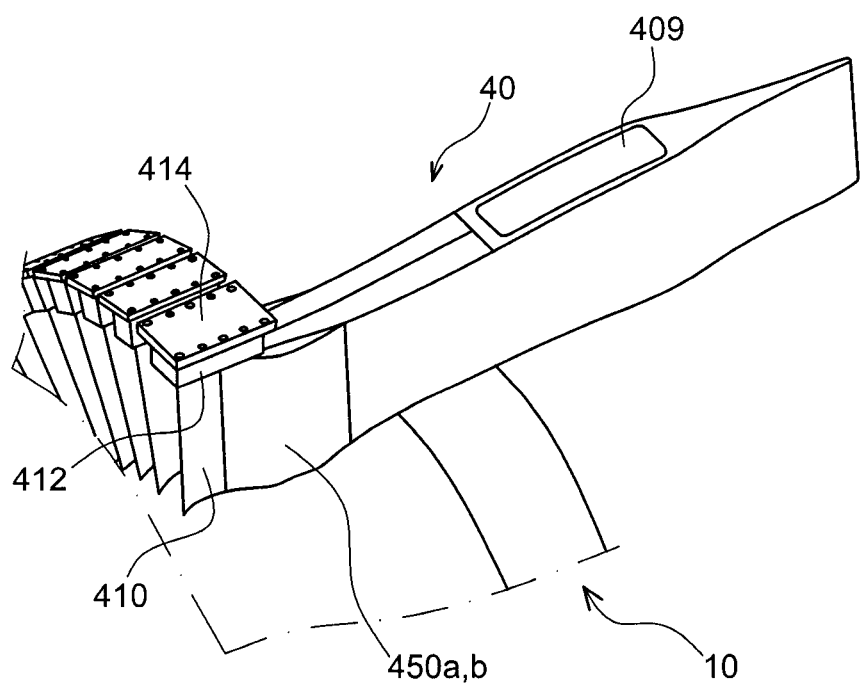
FIG. 8 is a partial perspective view of a turbine engine showing the method used to set up an aerodynamic test assembly according to the preferred embodiment of the invention.

With reference more specifically to FIG. 8, assembly/disassembly of the turbine engine 10 for each aerodynamic test using an insert 440 different from the previous insert also originating from the plurality of inserts 440 associated with a body 400 of a test vane 40 within an aerodynamic test assembly is made using a method including:
- a disassembly step during which at least one fan vane of a turbine engine 10 is disassembled, the upstream part 410 of the body 400 of the vane 40 being removed radially outwards, a first insert 4440 of the test assembly being removed axially through the front of the turbine engine 10,
- an assembly step during which a second insert 4442 of the test assembly is fitted axially through the front into the body 400 of the vane 40, the upstream part 410 being installed radially, and mechanically connected to the insert 440, the previously disassembled fan vanes being reassembled.

The elements of the test assembly can be assembled and/or disassembled without removing the turbine engine 10 from the test bench due to the presence of a plurality of inserts 440 in the aerodynamic test assembly.

Radial access to the test vane 40 is made particularly by previously disassembling the OGV "Outlet Guide Vane" arms, particularly from the attachment plate 414.

Obviously, those skilled in the art could make various modifications to the invention that has just been described without going outside the scope of the disclosure of the invention.

The invention claimed is:

1. A turbine engine aerodynamic test assembly comprising:
a turbine engine test vane including two opposite aerodynamic profiles, the turbine engine test vane comprising:
a first insert including a first central part and a first set of two opposite profiled parts mechanically connected to the first central part so as to be motionless to the first central part, each of the profiled parts of the first set of profiled parts including an external aerodynamic surface, and at least one of the profiled parts of the first set of profiled parts being configured to project on an upstream side and a downstream side of the first central part; and
a vane body including an upstream part, a downstream part, and a housing in which the first insert is configured to fit, the housing being located between the upstream part and the downstream part, and the housing opening up onto the two opposite aerodynamic profiles; and
a second insert including a second central part and a second set of two opposite profiled parts mechanically connected to the second central part so as to be motionless to the second central part, each of the profiled parts of the second set of profiled parts including an external aerodynamic surface, and at least one of the profiled parts of the second set of profiled parts being configured to project on an upstream and a downstream side of the second central part,
wherein the first and second inserts have different shapes and are configured to be removable and housed interchangeably in the housing of the vane body, and
wherein the aerodynamic profiles of the test engine turbine vane including either of the first insert and the second insert is aerodynamically continuous from the upstream part to the downstream part.

2. The turbine engine aerodynamic test assembly according to claim 1, wherein the first set of profiled parts are made as an integral part with the first central part, and the second set of profiled parts are made as an integral part with the second central part.

3. The turbine engine aerodynamic test assembly according to claim 1, wherein the first insert and the second insert are configured to fit into the vane body through at least one mortise and tenon assembly.

4. A device comprising: a turbine engine including an aerodynamic test assembly according to claim 1.

5. A method for assembling an aerodynamic test assembly according to claim 1 into a turbine engine on a test bench, the test vane being an output guide vane, comprising:
a disassembly step during which the turbine engine test vane is disassembled, the upstream part of the vane body being withdrawn radially outwards, the first insert of the test assembly being withdrawn axially through the front of the turbine engine, and
an assembly step during which the second insert of the test assembly being inserted axially through the front of the turbine engine in the vane body, the upstream part of the vane body being inserted radially while being mechanically connected to the second insert, the previously disassembled test vanes being reassembled.

* * * * *